(12) United States Patent
Williams et al.

(10) Patent No.: US 10,265,577 B1
(45) Date of Patent: Apr. 23, 2019

(54) APPARATUSES FOR PERFORMING PULL- OR PUSH-TYPE MANUAL EXERCISES

(71) Applicant: Brunswick Corporation, Lake Forest, IL (US)

(72) Inventors: Benjamin A. Williams, Coon Rapids, MN (US); Lee M. Atwood, St. Francis, MN (US)

(73) Assignee: Brunswick Corporation, Mettawa, IL (US)

( * ) Notice: Subject to any disclaimer, the term of this patent is extended or adjusted under 35 U.S.C. 154(b) by 212 days.

(21) Appl. No.: 15/403,634

(22) Filed: Jan. 11, 2017

(51) Int. Cl.
| A63B 23/12 | (2006.01) |
| F16B 43/00 | (2006.01) |
| A63B 1/00 | (2006.01) |
| F16B 37/04 | (2006.01) |

(52) U.S. Cl.
CPC ............ *A63B 23/1218* (2013.01); *A63B 1/00* (2013.01); *A63B 23/1227* (2013.01); *F16B 37/047* (2013.01); *F16B 43/00* (2013.01)

(58) Field of Classification Search
CPC ....... A63B 23/1218; A63B 1/00; A63B 65/04; A63B 21/4035; A63B 23/1227
See application file for complete search history.

(56) References Cited

U.S. PATENT DOCUMENTS

| 6,231,484 | B1* | 5/2001 | Gordon | A63B 69/18 482/51 |
| 8,807,898 | B2 | 8/2014 | Nelson et al. | |
| 2002/0077648 | A1* | 6/2002 | Lee | A61B 10/0266 606/170 |
| 2008/0015096 | A1* | 1/2008 | Isacowitz | A63B 21/04 482/130 |
| 2010/0167887 | A1* | 7/2010 | Berry | A63B 22/18 482/147 |
| 2011/0207545 | A1* | 8/2011 | Huff | A63B 69/0057 473/266 |
| 2013/0196824 | A1* | 8/2013 | Ross | A63B 1/005 482/40 |
| 2014/0228185 | A1* | 8/2014 | Meier | A63B 21/1465 482/139 |

OTHER PUBLICATIONS

Unpublished U.S. Appl. No. 14/664,302, filed Mar. 20, 2015.

* cited by examiner

*Primary Examiner* — Nyca T Nguyen
(74) *Attorney, Agent, or Firm* — Andrus Intellectual Property Law, LLP

(57) ABSTRACT

An exercise apparatus is for push- or pull-type manual exercises and comprises an axially elongated bar having a free end and a transverse bore located proximate to the free end. A ball is coupled to the free end. A base connector transversely extends into the transverse bore. A fastener fastens the ball to the base connector to thereby couple the ball to the free end.

23 Claims, 4 Drawing Sheets

APPARATUSES FOR PERFORMING PULL- OR PUSH-TYPE MANUAL EXERCISES

FIELD

The present disclosure relates to exercise apparatuses, including for example, apparatuses for performing pull- or push-type manual exercises.

BACKGROUND

The following U.S. patents and patent applications are incorporated herein by reference:

U.S. Pat. No. 8,807,898 discloses a connector assembly having a base part that defines a through-hole for receiving a bolt and also defines an aperture for receiving a device having a first end that fits through the aperture in the base part and a second end that does not fit through the aperture in the base part. The first end of the device defines a bolt-hole for engaging with a bolt extending though the through-hole in the base part. The second end of the device comprises opposing outer surfaces that engage the base part and thereby prevent the device from passing completely through the aperture, and also align the bolt-hole in the device with the through-hole in the base part when the first end of the device is inserted into the aperture.

U.S. patent application Ser. No. 14/664,302 filed Mar. 20, 2015, discloses a connector assembly comprising a one-piece connector device, and a base part that defines a through-hole having a forming wall structure for receiving a bolt and for receiving the connector device. The connector device has a rear portion that fits through the through-hole in the base part and a front portion which does not fit through the through-hole in the base part. The rear portion of the connector device defines a bolt hole for engaging the bolt extending through the through-hole in the base part. The front portion of the connector device defines an access opening aligned with the bolt hole in the rear portion for receiving the bolt. The rear portion is configured with engagement structure aligned with and engaged in abutting relationship with the forming wall structure upon movement of the connector device relative to the through-hole in the base part.

U.S. patent application Ser. No. 14/960,985, filed Dec. 7, 2015, discloses a connector assembly that includes a connector device and a base part provided with a mounting face that defines a through-hole having a forming wall structure for receiving a bolt and for receiving and retaining the connector device. The connector device has a rear portion and a front portion engaged together for movement relative to one another, the rear portion defining a threaded bolt hole for engaging the bolt extending through the through-hole and having a driven element positioned thereon. The front portion defines an access opening for receiving the bolt. Engagement of the driven element moves the rear portion relative to the front portion such that the bolt hole is aligned with the access opening and receives a threaded end of the bolt.

SUMMARY

This Summary is provided to introduce a selection of concepts that are further described below in the detailed description. This Summary is not intended to identify key or essential features of the claimed subject matter, nor is it intended to be used as an aid in limiting the scope of the claimed subject matter. According to examples disclosed herein, an exercise apparatus for push- or pull-type manual exercises comprises an axially elongated bar having a free end and a transverse bore located proximate to the free end. A ball is coupled to the free end. A base connector transversely extends into the transverse bore. A fastener fastens the ball to the base connector to thereby couple the ball to the free end.

BRIEF DESCRIPTION OF THE DRAWINGS

Examples of exercise apparatuses having connector devices and assemblies are described with reference to the following figures. The same numbers are used throughout the figures to reference like features and components.

DETAILED DESCRIPTION OF THE DRAWINGS

During research and development, the present inventors have determined that it is desirable to provide a durable connection between a "rock ball" and a base member such as a tube for performing a pull-up type or other type manual exercise. The present inventors have determined that existing devices and methods for connecting rock balls to base members are subject to wear and failure over time. Failure of the connection between the rock ball and the base member can lead to injury and require repair/replacement of the apparatus.

Figure 1:
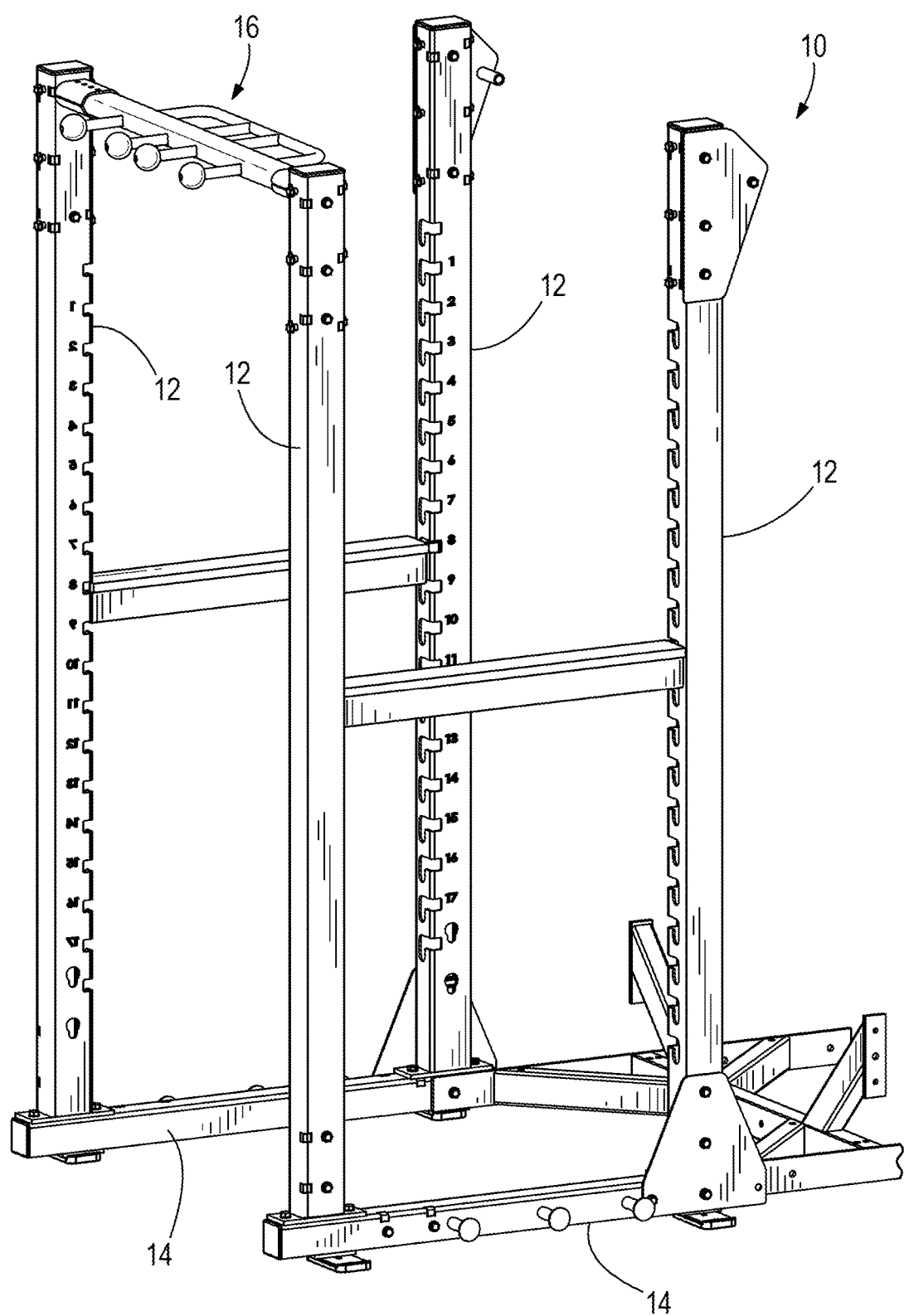
FIG. 1 is a perspective view of an exercise apparatus according to the present disclosure.
Figure 2:
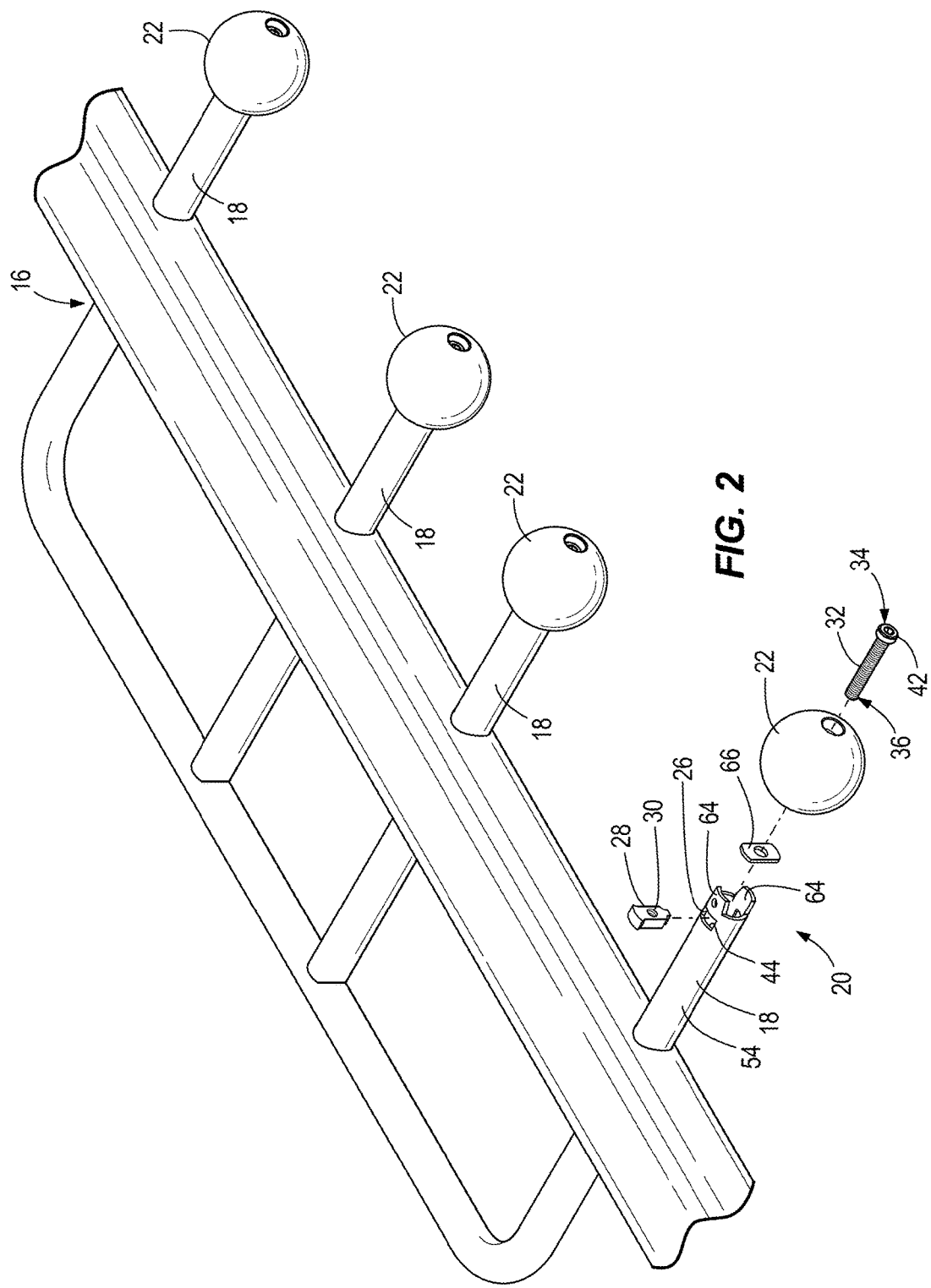
FIG. 2 is an exploded view of portions of the exercise apparatus.

FIG. 1 depicts an exercise apparatus 10 including a plurality of vertical support columns 12 and a supporting base 14. A chin-up frame 16 extends between two of the vertical support columns 12 and includes four axially elongated chin-up bars 18 that each extend from the frame 16 and have a free end 20. A ball 22 is coupled to the free end 20 of each chin-up bar 18. Each ball 22 is coupled to the respective axially elongated bar 18 by a connector apparatus according to the present disclosure. As is known in the art, the balls 22 are configured for manual grasping by an individual performing a chin-up exercise on the exercise apparatus 10; however the concepts of the present disclosure are not limited to chin-up bars and also can be employed in apparatuses for performing push-up manual type exercises, or any other type of exercise that requires a user operable member coupled to the free end of a supporting member.

Referring to FIGS. 2-5, a transverse bore 26 is formed in the axially elongated bar 18 at a location proximate to the free end 20. A base connector 28 transversely extends into the transverse bore 26. The base connector 28 has an axially extending hole 30 formed therein. The hole 30 is configured for engagement with a fastener 32 which fastens the ball 22 to the base connector 28, thereby coupling the ball 22 to the free end 20 of the axially elongated bar 18. The exact shape and configuration of the base connector 28 can vary from that which is shown and described herein. Also, as mentioned above, the concepts of the present disclosure can be utilized to connect other type of user-operable members, besides "rock balls", including any other type of exercise apparatus having a user operable member coupled to a free end of a supporting member.

The fastener 32 has a first end 34 engaged with the ball 22 and a second end 36 engaged with the base connector 28. In the illustrated example, the axially extending hole 30 is a threaded hole and the second end 36 of the fastener 32 is a threaded end that is screwed into engagement with the threaded hole. The ball 22 has a throughbore 38 in which the fastener 32 is installed. The throughbore 38 has an axial abutment surface 40 and the fastener 32 has a head 42 that abuts the axial abutment surface 40 when the second end 36 of the fastener 32 is engaged with the base connector 28, to thereby clamp the ball 22 onto the free end 20 of the axially elongated bar 18 when the fastener 32 is screwed into engagement with the base connector 28.

The transverse bore 26 has an inlet window 44 into which the base connector 28 is manually installed. A first portion 46 of the base connector 28 is sized and shaped small enough to fit into and pass through the inlet window 44. A second portion 48 of the base connector 28 is sized larger than the first portion 46 so that the second portion 48 cannot pass through the inlet window 44 during said installation.

Figure 5:
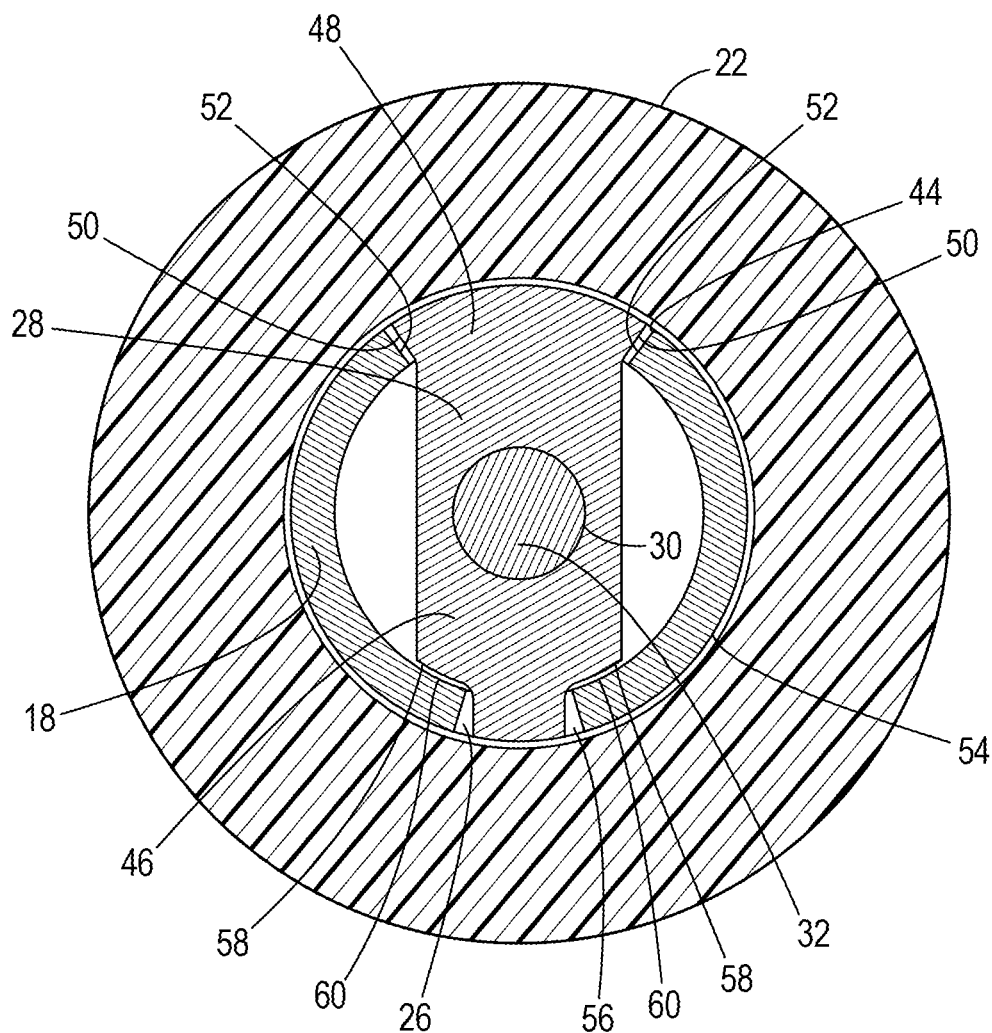
FIG. 5 is a view of Section 5-5, taken in FIG. 3.

The second portion 48 of the base connector 28 is configured to nest in the inlet window 44. In the illustrated example, the second portion 48 has radially opposing abutment surfaces 50 that engage with corresponding radially opposing abutment surfaces 52 adjacent the inlet window 44. As shown in FIG. 5, the second portion 48 of the base connector 28 resides flush with the radially outer surface 54 of the axially elongated bar 18 when the second portion 48 of the base connector 28 is nested in the inlet window 44.

The transverse bore 26 further includes an outlet window 56. The inlet window 44 and the outlet window 56 radially are radially opposed with respect to each other relative to the axially elongated bar 18. The inlet window 44 is sized larger than the outlet window 56 such that the first portion 46 of the base connector 28 fits in the outlet window 56 when the base connector 28 is installed into the transverse bore 26. The first portion 46 of the base connector 28 is configured to nest in the outlet window 56. As shown in FIG. 5, the first portion 46 of the base connector 28 resides flush with the radially outer surface 54 of the axially elongated bar 18 when the first portion 46 of the base connector 28 is nested in the outlet window 56. In the illustrated example, the second portion 48 of the base connector 28 has radially opposing abutment surfaces 58 that engage with corresponding radially opposing abutment surfaces 60 adjacent the outlet window 56.

The free end 20 of the axially elongated bar 18 has radially opposing ramp surfaces 62 that are configured to wedge into engagement with the throughbore 38 of the ball 22 when the fastener 32 is engaged with the base connector 28. The opposing ramp surfaces 62 are formed on an axial extension 64 of the axially elongated bar 18. In the illustrated example, a pair of radially opposing axial extensions 64 together form two pairs of opposing ramp surfaces 62 that wedge into engagement with the ball 22 when the fastener 32 is engaged with the base connector. The ramp-shaped features of the surfaces 62 advantageously operate as a wedge that ensures a snug fit between the free end 20 and the ball 22, regardless of potential tolerance stack up issues. The ramp-shaped features also prevent rotation of the ball 22 with respect to the free end 20, which otherwise can cause the fastener 32 to loosen over time.

A washer 66 is sandwiched between axial end surfaces 68, 70 of the pair of radially opposing axial extensions 64 and an interior abutment channel 72 in the ball 22. The fastener 32 extends through the washer 70 and through the interior abutment channel 72. The washer 66 can be made of metal when the ball 22 is made of a rubber material. Thus the washer 66 limits axial forces on the ball 22, which is often made of polyester resin, when the fastener 32 is screwed into the base connector 28.

Figure 3:
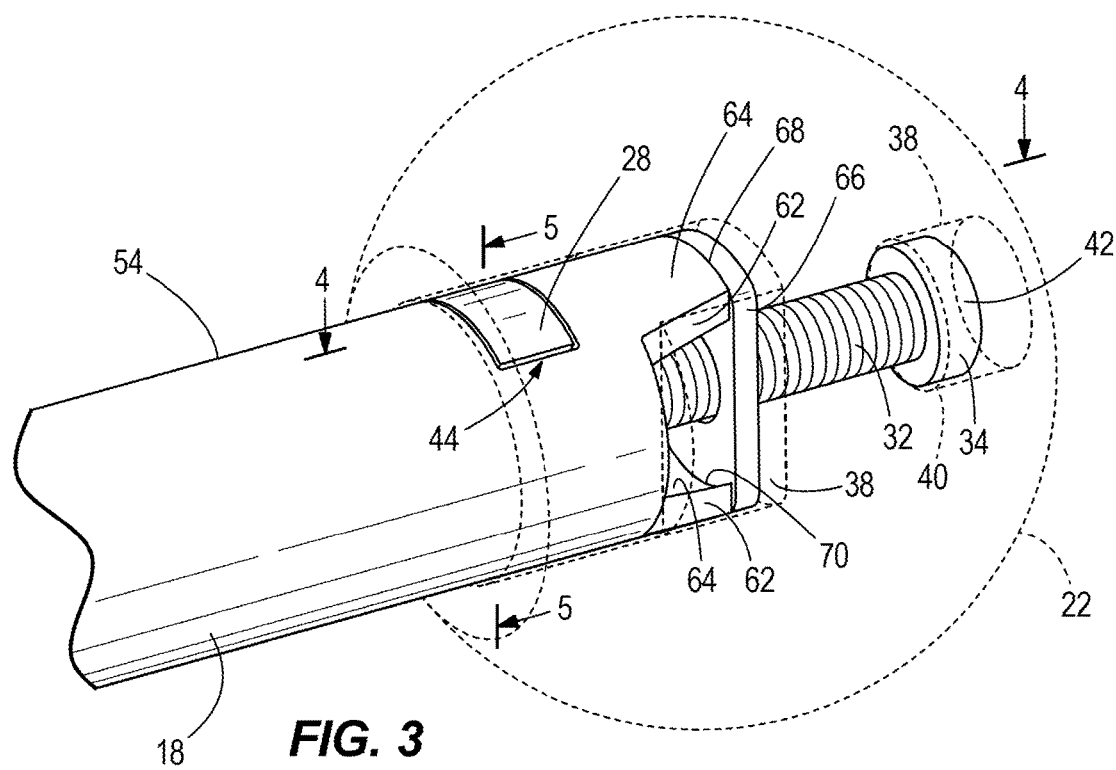
FIG. 3 is a perspective view, partially in phantom, of a ball and fastener according to the present disclosure.
Figure 4:
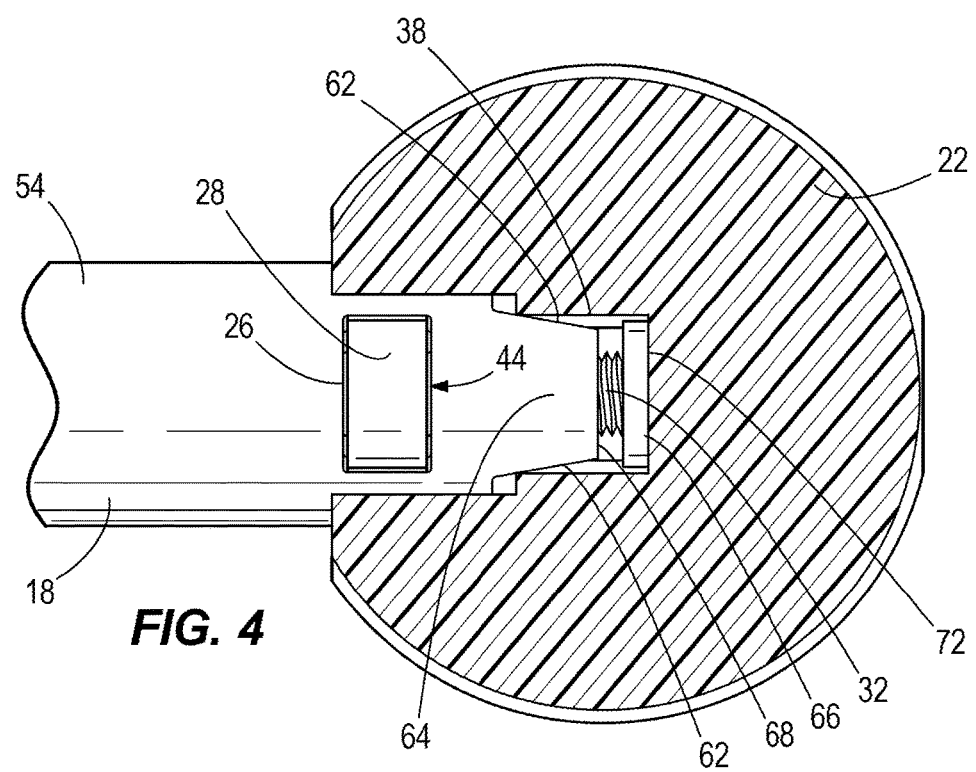
FIG. 4 is a view of Section 4-4, taken in FIG. 3.

As shown in FIG. 3, advantageously, the ball 22 axially overlaps the transverse bore 26 and base connector 28 so that the transverse bore 26 and base connector 28 are not visible when the ball 22 is coupled to the free end 20. This advantageously provides a clean aesthetic appearance.

In the present description, certain terms have been used for brevity, clearness and understanding. No unnecessary limitations are to be inferred therefrom beyond the requirement of the prior art because such terms are used for descriptive purposes only and are intended to be broadly construed. The different devices and assemblies described herein may be used alone or in combination with other devices and/or assemblies. Various equivalents, alternatives, and modifications are possible within the scope of the appended claims.

What is claimed is:

1. An exercise apparatus comprising an axially elongated bar having a free end and a transverse bore located proximate to the free end, a ball coupled to the free end, a base connector transversely extending into the transverse bore, and a fastener fastening the ball to the base connector to thereby couple the ball to the free end;

wherein the transverse bore comprises an inlet window into which the base connector is installed, wherein a first portion of the base connector is configured to fit into and pass through the inlet window, and wherein a second portion of the base connector is larger than the first portion of the base connector so that the second portion cannot pass through the inlet window;

wherein the transverse bore further comprises an outlet window, and wherein the inlet window and outlet window radially oppose each other with respect to the axially elongated bar; and wherein the inlet window is larger than the outlet window.

2. The exercise apparatus according to claim 1, wherein the first portion of the base connector is configured to fit into the outlet window when the base connector is installed into the transverse bore.

3. The exercise apparatus according to claim 2, wherein the first portion of the base connector is configured to nest in the outlet window.

4. The exercise apparatus according to claim 3, wherein the first portion of the base connector resides flush with a radially outer surface of the axially elongated bar when the first portion of the base connector is nested in the outlet window.

5. The exercise apparatus according to claim 4, wherein the second portion of the base connector has radially opposing abutment surfaces that engage with corresponding radially opposing abutment surfaces located adjacent to the outlet window.

6. An exercise apparatus comprising an axially elongated bar having a free end and a transverse bore located proximate to the free end, a ball coupled to the free end, a base connector transversely extending into the transverse bore, and a fastener fastening the ball to the base connector to thereby couple the ball to the free end;

wherein the base connector has an axially extending hole therein and wherein the fastener is engaged with the base connector via the axially extending hole;

wherein the transverse bore comprises an inlet window into which the base connector is installed, wherein a first portion of the base connector is configured to fit into and pass through the inlet window, and wherein a second portion of the base connector is larger than the first portion of the base connector so that the second portion cannot pass through the inlet window;
wherein the second portion of the base connector is configured to nest in the inlet window; and
wherein the ball overlaps the transverse bore and base connector so that the transverse bore and base connector are not visible when the ball is coupled to the free end.

7. The exercise apparatus according to claim 1, wherein the fastener has a first end engaged with the ball and a second end engaged with the base connector.

8. The exercise apparatus according to claim 7, wherein the axially extending hole is a threaded hole and wherein the second end of the fastener is a threaded end that is screwed into engagement with the threaded hole.

9. The exercise apparatus according to claim 7, wherein the ball has a throughbore, wherein the through-bore has an axial abutment surface, and wherein the first end of the fastener has a head that abuts the axial abutment surface when the second end of the fastener is engaged with the base connector to thereby clamp the ball onto the free end.

10. The exercise apparatus according to claim 6, wherein the free end comprises radially opposing ramp surfaces that wedge into engagement with the ball when the fastener is engaged with the base connector.

11. An exercise apparatus comprising an axially elongated bar having a free end and a transverse bore located proximate to the free end, a ball coupled to the free end, a base connector transversely extending into the transverse bore, and a fastener fastening the ball to the base connector to thereby couple the ball to the free end;
wherein the transverse bore comprises an inlet window into which the base connector is installed, wherein a first portion of the base connector is configured to fit into and pass through the inlet window, and wherein a second portion of the base connector is larger than the first portion of the base connector so that the second portion cannot pass through the inlet window;
wherein the second portion of the base connector is configured to nest in the inlet window; and
wherein the second portion of the base connector resides flush with a radially outer surface of the axially elongated bar when the second portion of the base connector is nested in the inlet window.

12. The exercise apparatus according to claim 11, wherein the base connector has an axially extending hole therein and wherein the fastener is engaged with the base connector via the axially extending hole.

13. The exercise apparatus according to claim 11, wherein the second portion of the base connector has radially opposing abutment surfaces that engage with corresponding radially opposing abutment surfaces located adjacent to the inlet window.

14. The exercise apparatus according to claim 11, wherein the transverse bore further comprises an outlet window, and wherein the inlet window and outlet window radially oppose each other with respect to the axially elongated bar.

15. The exercise apparatus according to claim 11, wherein the ball overlaps the transverse bore and base connector so that the transverse bore and base connector are not visible when the ball is coupled to the free end.

16. An exercise apparatus comprising an axially elongated bar having a free end and a transverse bore located proximate to the free end, a ball coupled to the free end, a base connector transversely extending into the transverse bore, and a fastener fastening the ball to the base connector to thereby couple the ball to the free end;
wherein the free end comprises radially opposing ramp surfaces that wedge into engagement with the ball when the fastener is engaged with the base connector; and
wherein the opposing ramp surfaces are formed on an axial extension of the axially elongated bar.

17. The exercise apparatus according to claim 16, wherein the axial extension is one of a pair of radially opposing axial extensions that together form two pairs of opposing ramp surfaces that wedge into engagement with the ball when the fastener is engaged with the base connector.

18. The exercise apparatus according to claim 17, further comprising a washer that is sandwiched between axial end surfaces of the pair of radially opposing axial extensions and an interior abutment channel in the ball, wherein the fastener extends through the washer and through the interior abutment channel.

19. An exercise apparatus comprising an axially elongated bar having a free end and a transverse bore located proximate to the free end, a user operable member coupled to the free end, a base connector transversely extending into the transverse bore, and a fastener fastening the user operable member to the base connector to thereby couple the user operable member to the free end;
wherein the transverse bore comprises an inlet window into which the base connector is installed, wherein a first portion of the base connector is configured to fit into and pass through the inlet window, and wherein a second portion of the base connector is larger than the first portion of the base connector so that the second portion cannot pass through the inlet window;
wherein the second portion of the base connector is configured to nest in the inlet window; and
wherein the user operable member is a ball, the ball overlaps the transverse bore and base connector so that the transverse bore and base connector are not visible when the ball is coupled to the free end.

20. The exercise apparatus according to claim 19, wherein the user operable member has a throughbore, wherein the through-bore has an axial abutment surface, and wherein the first end of the fastener has a head that abuts the axial abutment surface when the second end of the fastener is engaged with the base connector to thereby clamp the user operable member onto the free end.

21. The exercise apparatus according to claim 19, wherein the user operable member overlaps the transverse bore and base connector so that the transverse bore and base connector are not visible when the user operable member is coupled to the free end.

22. An exercise apparatus comprising an axially elongated bar having a free end and a transverse bore located proximate to the free end, a user operable member coupled to the free end, a base connector transversely extending into the transverse bore, and a fastener fastening the user operable member to the base connector to thereby couple the user operable member to the free end;
wherein the transverse bore comprises an inlet window into which the base connector is installed, wherein a first portion of the base connector is configured to fit into and pass through the inlet window, and wherein a second portion of the base connector is larger than the first portion of the base connector so that the second portion cannot pass through the inlet window; wherein the second portion of the base connector is configured to nest in the inlet window; wherein the second portion of the base connector resides flush with a radially outer surface of the axially elongated bar when the second portion of the base connector is nested in the inlet window; and wherein the second portion of the base connector has radially opposing abutment surfaces that engage with corresponding radially opposing abutment surfaces located adjacent to the inlet window.

23. The exercise apparatus according to claim 22, wherein the transverse bore further comprises an outlet window, wherein the inlet window and outlet window radially oppose each other with respect to the axially elongated bar; wherein the inlet window is larger than the outlet window; wherein the first portion of the base connector is configured to fit into the outlet window when the base connector is installed into the transverse bore; wherein the first portion of the base connector is configured to nest in the outlet window; wherein the first portion of the base connector resides flush with a radially outer surface of the axially elongated bar when the first portion of the base connector is nested in the outlet window; and wherein the second portion of the base connector has radially opposing abutment surfaces that engage with corresponding radially opposing abutment surfaces located adjacent to the outlet window.

* * * * *